(12) United States Patent
Kim et al.

(10) Patent No.: US 7,921,140 B2
(45) Date of Patent: Apr. 5, 2011

(54) APPARATUS AND METHOD FOR BROWSING CONTENTS

(75) Inventors: Yong-sung Kim, Suwon-si (KR);
Tae-ung Jung, Suwon-si (KR);
Dong-seop Kwon, Seoul (KR);
Hae-seon Park, Seoul (KR); Kyoung-gu Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 11/727,107

(22) Filed: Mar. 23, 2007

(65) Prior Publication Data
US 2007/0294211 A1    Dec. 20, 2007

(30) Foreign Application Priority Data
Jun. 15, 2006  (KR) ................ 10-2006-0053998

(51) Int. Cl.
*G06F 7/00* (2006.01)
*G06F 17/30* (2006.01)

(52) U.S. Cl. ............. 707/802; 707/736; 707/797
(58) Field of Classification Search .......... None
See application file for complete search history.

(56) References Cited

U.S. PATENT DOCUMENTS

| | | | | |
|---|---|---|---|---|
| 5,933,599 | A * | 8/1999 | Nolan ................ | 715/734 |
| 6,804,677 | B2 * | 10/2004 | Shadmon et al. .......... | 707/101 |
| 7,080,081 | B2 * | 7/2006 | Agarwal et al. .......... | 707/100 |
| 7,428,546 | B2 * | 9/2008 | Nori et al. .............. | 707/101 |

\* cited by examiner

*Primary Examiner* — Pierre M Vital
*Assistant Examiner* — Loan T Nguyen
(74) *Attorney, Agent, or Firm* — NSIP Law

(57) ABSTRACT

An apparatus and method for browsing contents, the apparatus including: a generation module to generate a key value using metadata of contents as an input value; a management module to manage an index for accessing the key value; and an output module to output a user interface (UI) required to browse the contents using the key value included in a leaf node of the index.

22 Claims, 11 Drawing Sheets

| ID | TITLE | KEY | DATE | KEY |
|---|---|---|---|---|
| ... | ... | ... | ... | ... |
| 132 | ABC NEWS | A | 20060202 | 200602 |
| 133 | AMERICA THIS WEEK | A | 20060208 | 200602 |
| 134 | BBC NEWS | B | 20060220 | 200602 |
| 135 | CNN NEWS | C | 20060222 | 200602 |
| 136 | ENDLESS LOVE | E | 20060229 | 200602 |
| 137 | EBS RADIO | E | 20060301 | 200603 |
| 138 | ETERNAL SUNSHINE | E | 20060305 | 200603 |
| 139 | RADIO STAR | R | 20060311 | 200603 |
| 140 | THE WEEK IN REVIEW | T | 20060323 | 200603 |
| ... | ... | ... | ... | ... |

APPARATUS AND METHOD FOR BROWSING CONTENTS

CROSS-REFERENCE TO RELATED APPLICATION

This application claims the benefit of Korean Patent Application No. 2006-53998 filed on Jun. 15, 2006 in the Korean Intellectual Property Office, the disclosure of which is incorporated herein by reference.

BACKGROUND OF THE INVENTION

1. Field of the Invention

Aspects of the present invention relate to an apparatus and method for browsing contents, and more particularly, to an apparatus and method capable of enabling a user to efficiently browse contents.

2. Description of the Related Art

As the capacity of digital storage devices (such as hard disk drives and flash memories) increases and technology for compressing contents develops, the amount of contents that can be stored and managed by the digital storage devices is rapidly increasing. Accordingly, digital storage devices, which could previously store only tens or hundreds of pieces of contents, are now capable of storing thousands or tens of thousands of pieces of contents. As a result, searching for desired contents has become much more difficult. In particular, most handheld or home multimedia apparatuses are generally provided with limited input devices (such as simple buttons or remote controls) as opposed to a keyboard or mouse. As a result, browsing and selecting contents can be difficult using these limited input devices.

Figure 1A:
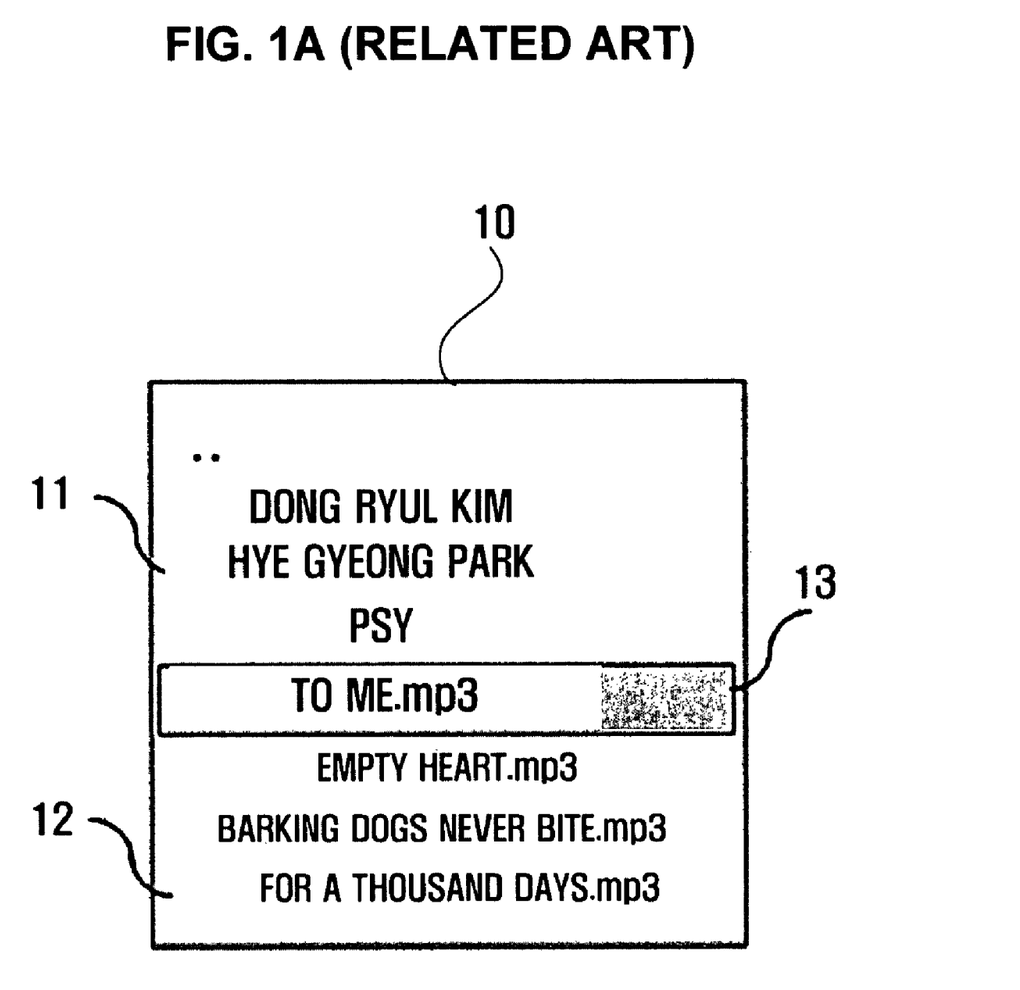
FIGS. 1A-1B illustrate conventional methods of browsing contents.
Figure 1B:
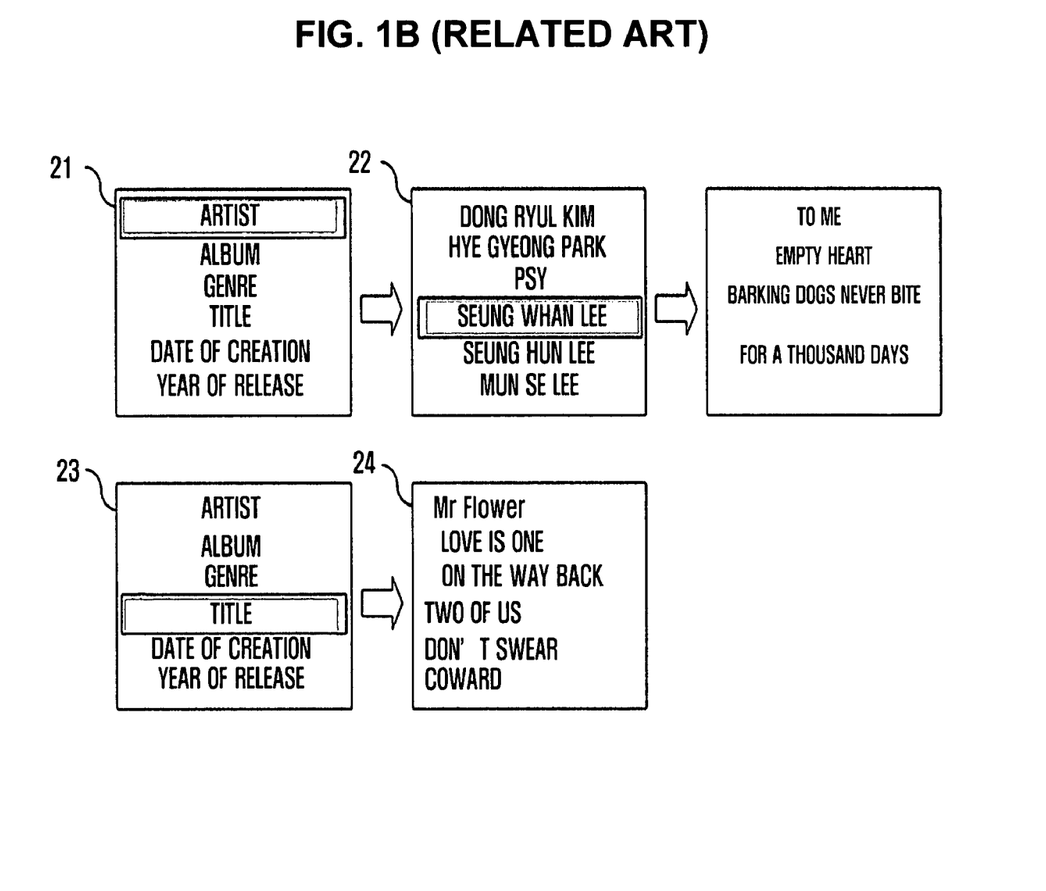

FIGS. 1A and 1B illustrate conventional methods of browsing contents. Referring to FIG. 1A, a basic contents browsing method includes storing a plurality of contents in files and bundling and browsing the files by folder. FIG. 1A illustrates an example of browsing MP3 music contents based on file and folder. Referring to FIG. 1A, folders 11 and files 12 are displayed on a screen 10 of a digital display. A user may open a folder using a cursor 13 and browse files 12 within a selected folder 11. In order to find desired contents using this file and folder-based contents browsing method, the user has to remember a file name of the desired contents that are stored in a corresponding folder. In addition, if the amount of contents increases, the desired contents can be difficult for the user to locate and select.

A metadata-based contents browsing method illustrated in FIG. 1B includes extracting metadata 21 and 23, which is additional data describing contents 22 and 24, from the contents 22 and 24 and browsing the contents 22 and 24 based on the extracted metadata 21 and 23. Metadata 21 and 23 includes file attributes, tag information corresponding to a multimedia type, and description of contents 22 and 24. When contents 22 and 24 are input to a device, metadata 21 and 23 of the contents 22 and 24 may be extracted directly by the device or by an external device.

FIG. 1B illustrates an example of browsing MP3 music contents 22 and 24 based on metadata. Referring to FIG. 1B, a user may browse MP3 music contents 22 and 24 based on various metadata 21 and 23 extracted from the MP3 music contents 22 and 24, such as artist, album, genre, title, date of creation, and year of release. If the user selects any one of the extracted metadata 21 and 23, contents 22 or 24 corresponding to the selected metadata 21 or 23 can be browsed. Compared with the file and folder-based contents browsing method of FIG. 1A, the metadata-based contents browsing method of FIG. 1B can utilize more various information. In addition, in the metadata-based contents browsing method, desired contents 22 and 24 can be found if any one of available metadata 21 or 23 is identified. Therefore, the metadata-based contents browsing method is more efficient than the file and folder-based contents browsing method.

However, although the metadata-based contents browsing method uses more various information than the file and folder-based contents browsing method, finding desired contents can still be increasingly difficult as the amount of contents increases. Therefore, an efficient contents browsing service that enables a user to easily and quickly browse desired contents even when the amount of contents increases is required.

SUMMARY OF THE INVENTION

Several aspects and example embodiments of the present invention provide an apparatus and method for efficiently browsing contents.

Additional aspects and/or advantages of the invention will be set forth in part in the description which follows and, in part, will be obvious from the description or may be learned by practice of the invention.

According to an aspect of the present invention, there is provided an apparatus for browsing contents, the apparatus including: a generation module to generate a key value using metadata of the contents; a management module to manage an index for accessing the key value; and an output module to output a user interface (UI) for browsing the contents using the key value, which is included in a leaf node of the index.

According to another aspect of the present invention, there is provided a method of browsing contents, the method including: generating a key value using metadata of the contents; managing an index for accessing the key value; and outputting a UI for browsing the contents using the key value, which is included in a leaf node of the index.

According to another aspect of the present invention, there is provided an apparatus for indexing contents to be browsed, the apparatus including: a generation module to generate a key value corresponding to metadata of the contents; and a management module to manage an index for accessing the contents, wherein the index comprises a leaf node corresponding to the key value.

According to another aspect of the present invention, there is provided a method of indexing contents, the method including: generating a key value corresponding to metadata of the contents; and adding the key value to a leaf node of an index used for accessing the contents.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
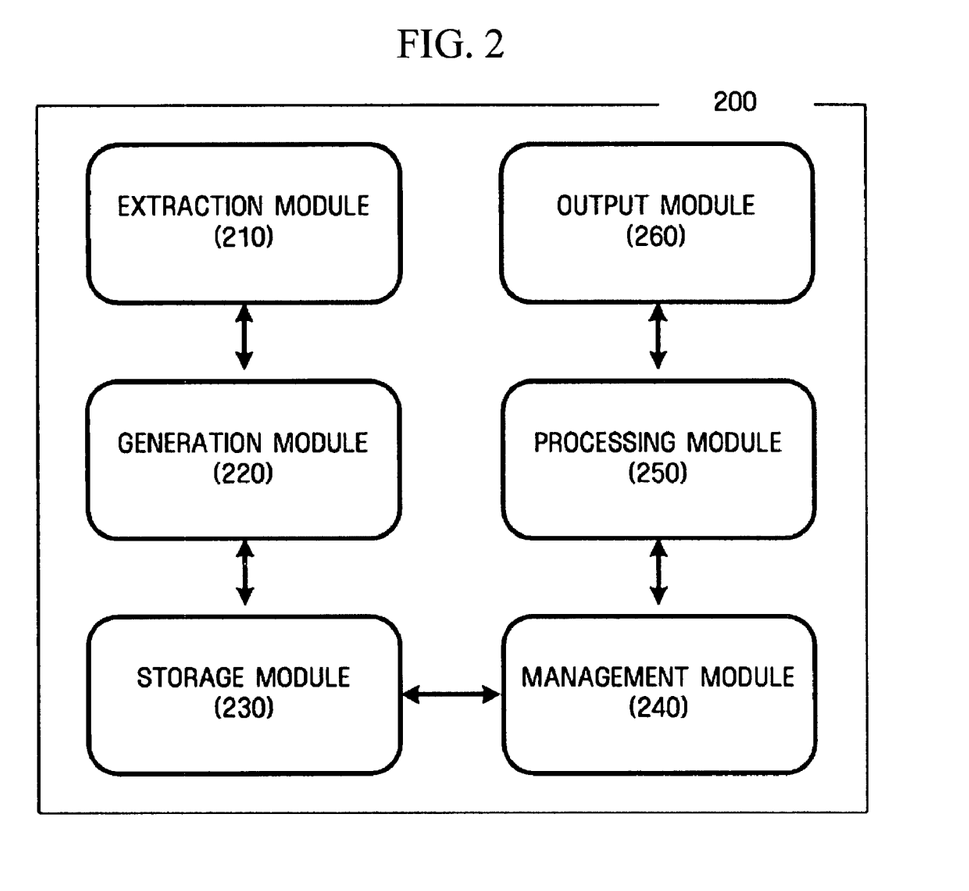
FIG. 2 is a block diagram of an apparatus for browsing contents according to an example embodiment of the present invention.

FIG. 2 is a block diagram of an apparatus 200 for browsing contents according to an example embodiment of the present invention. Referring to FIG. 2, the apparatus 200 includes an extraction module 210, a generation module 220, a storage module 230, a management module 240, a processing module 250, and an output module 260. The apparatus 200 can be, or can be incorporated into, a main device that can be any mobile or stationary multimedia device, including, for example, a mobile phone, a notebook computer, a personal digital assistant, a portable multimedia player, and a personal computer. The contents can be any of audio files, video files, and image files.

When contents are input to a device, according to the example embodiment illustrated in FIG. 2, the extraction module 210 extracts metadata from the contents. Alternatively, metadata may be extracted from the contents by an external device and input to the device together with the contents, and the extraction module 210 may be omitted. The extraction module 210 may include, for example, an identification (ID) 3 metadata extractor to extract metadata from MP3 music contents (such as title, singer, genre, album name, and year of release) and/or an Exif, TIFF, or GPS metadata extractor to extract a photographing date and photographing information from an image file (such as a JPEG file).

The generation module 220 assigns the same key value to metadata that belongs to a certain category using the extracted metadata as an input value. Then, the generation module 220 generates a clustering key value using the assigned key value (hereinafter, also referred to as a key). Therefore, metadata having the same key value may be included in the same shortcut. The shortcut may be a link or menu option provided in a user interface (UI) (i.e., browser) used to browse the contents. For date-related metadata, the generation module 220 may generate, for example, a key "200601" in order to include contents between 12:00 a.m. on Jan. 1, 2006 and 12:00 a.m. on Feb. 1, 2006 in a shortcut "January 2006." For text-related metadata, the generation module 220 may generate, for example, a key "A" for all text having a first letter of "A" and a key "B" for all text having a first letter of "B" in order to provide shortcuts in alphabetical order. Similarly, for number-related metadata, the generation module 220 may, for example, select a digit and generate a key "100" for numbers between 0 and 99 and a key "200" for numbers between 100 and 199. More specific examples will be described later with reference to FIG. 4.

The storage module 230 stores metadata and clustering keys generated by the generation module 220. Here, a relational database technology may be used. The storage module 230 may be a volatile memory (such as RAM) or a non-volatile memory (such as ROM, flash memory, or a hard disk drive).

The management module 240 manages data stored in the storage module 230 based, for example, on an index that uses a B tree (hereinafter, referred to as a "B-tree index"). The B tree is a multi-directional search tree and is a tree-shaped data structure designed to efficiently search and update large-volume files. A key value is stored in each leaf node of the B-tree index, and IDs of contents having the same key value are stored in a separate extension node. The IDs may point to locations of the contents. Alternatively, other indexing methods (such as a Hash indexing method) may be used to manage the data.

The processing module 250 generates a query using a key value of a shortcut and searches the B-tree index from a root node for a leaf node corresponding to the shortcut. That is, when a user selects a shortcut, the processing module 250 searches the B-tree index from the root node for a leaf node corresponding to a key value of the selected shortcut. Here, the processing module 250 may sequentially search an extension node indicated by the leaf node and display, on a screen of the device, via the output module 260, lists of contents that correspond to IDs of the contents stored in the extension node.

The output module 260 may sequentially explore (browse) the leaf nodes along pointers of the leaf nodes of the B-tree index and output (display) shortcuts using the key values stored in the leaf nodes. The shortcuts may be output to an external display device or displayed on a screen of-the device. The management module 240 and the output module 260 will be described in more detail later with reference to FIG. 8.

Each component illustrated in FIG. 2 may be implemented as a module. The term module, as used herein, refers to, but is not limited to, a software or hardware component, such as a Field Programmable Gate Array (FPGA) or Application Specific Integrated Circuit (ASIC), that performs certain tasks. A module may be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 3:
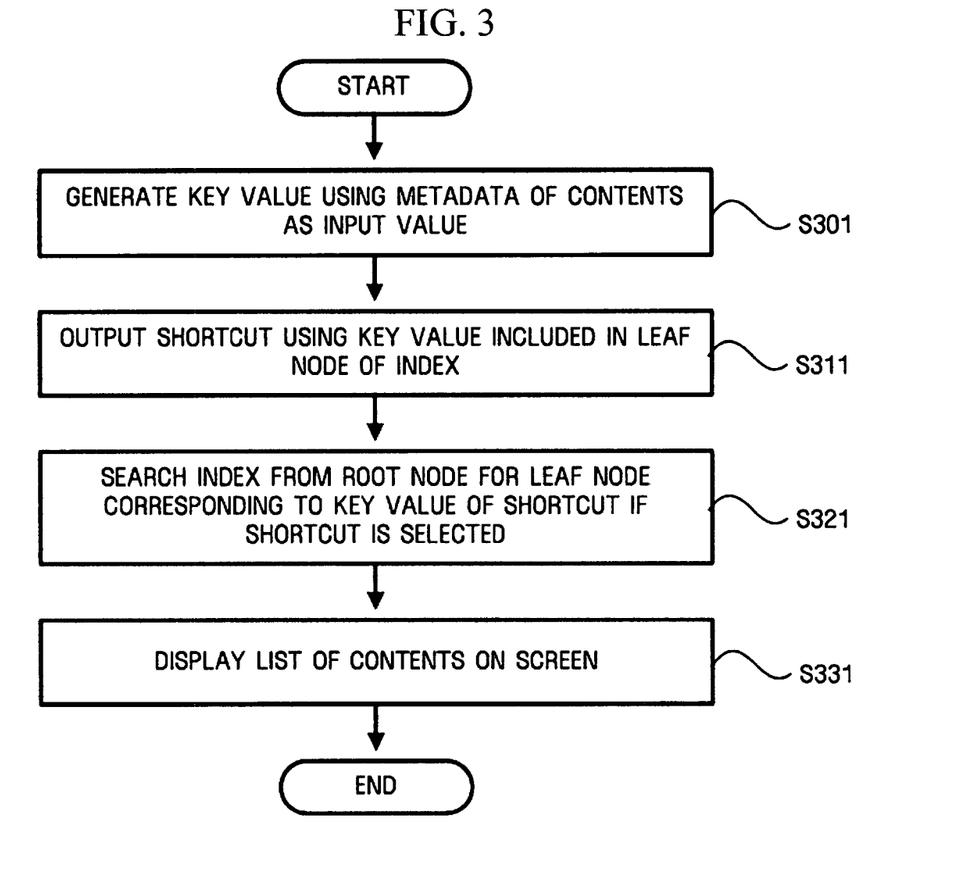
FIG. 3 is a flowchart illustrating a method of browsing contents using the apparatus of FIG. 2 according to an example embodiment of the present invention.

FIG. 3 is a flowchart illustrating a method of browsing contents using the apparatus 200 of FIG. 2 according to an example embodiment of the present invention. Referring to FIG. 3, the generation module 220 generates a key value using metadata of extracted contents as an input value (operation S301). That is, the same key value is assigned to metadata that belongs to a certain category using extracted metadata as an input value. As a result, metadata having the same key value can be included in the same shortcut.

A shortcut may be displayed on a screen of the device, via the output module 260, using the key value included in a leaf node of a B-tree index (operation S311). The shortcut may perform a UI function for browsing contents.

If the shortcut is selected, the B-tree index is searched from a root node for the leaf node corresponding to the key value of the shortcut using the processing module 250 (operation S321).

Next, a list of contents is displayed on the screen of the device, via the output module 260 (operation S331). An extension node pointed at by the leaf node is explored to find IDs (information) of contents having the attribute indicated by the selected shortcut. Then, a list contents corresponding to the IDs may be displayed on the screen. The list may be limited in terms of the quantity of corresponding contents according to a user request.

Figure 4A:
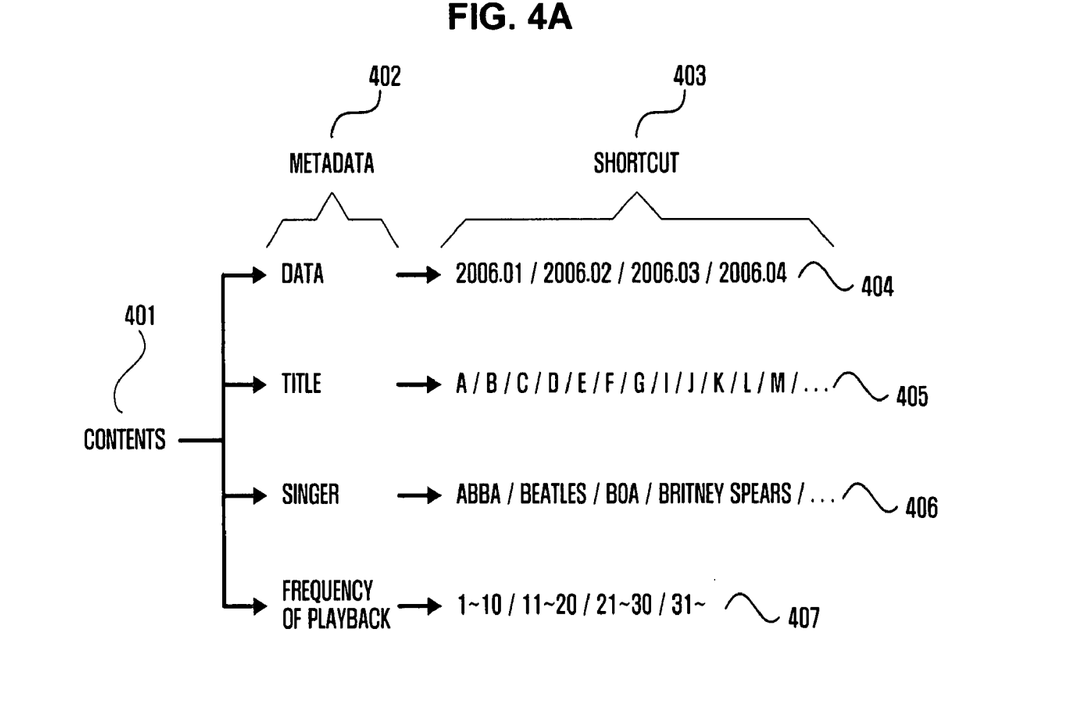
FIGS. 4A-4B illustrate shortcuts into which metadata is clustered according to an example embodiment of the present invention
Figure 4B:
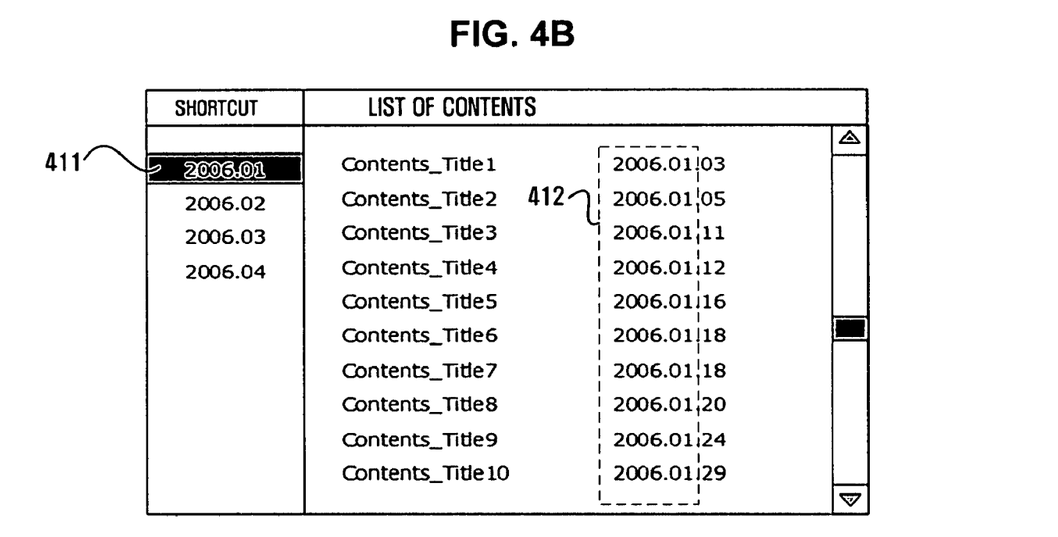

FIGS. 4A and 4B illustrate shortcuts into which metadata is clustered according to an example embodiment of the present invention. Referring to FIG. 4A, when a user browses contents 401 based on metadata 402, shortcuts 403 may be provided so that the user can easily and quickly browse desired contents even if the amount of the contents 401 increases. That is, a key (value) is generated by assigning the same value to metadata that belongs to a certain category, and the metadata having the same key value is bundled into the same shortcut so that the user can efficiently browse the contents 401.

For example, when the user browses the contents 401 based on date-related metadata (such as year of release or date of creation), the contents 401 are clustered in units of months as indicated by reference numeral 404. Therefore, if the user selects a shortcut indicating a particular month, the user can go directly to contents corresponding to the month. In this case, a key value may be generated by assigning the same value to metadata that belongs to the month, and the metadata having the same key value may be bundled into the same shortcut. Therefore, even if there is a large amount of contents, the user can easily and quickly access desired contents using the shortcut. Based on this principle, titles may be clustered in alphabetical order as indicated by reference numeral 405, singers may be clustered by name as indicated by reference numeral 406, and the frequency of playback may be clustered by every ten times the file is played back as indicated by reference numeral 407. Then, corresponding shortcuts may be provided to the user so that the user can access desired contents more quickly.

Referring to FIG. 4B, contents are clustered in units of months, and the clustered contents are provided as shortcuts. In this case, if a user selects a shortcut "2006.01" 411, a list of contents 412 corresponding to January 2006 is displayed.

Figure 5A:
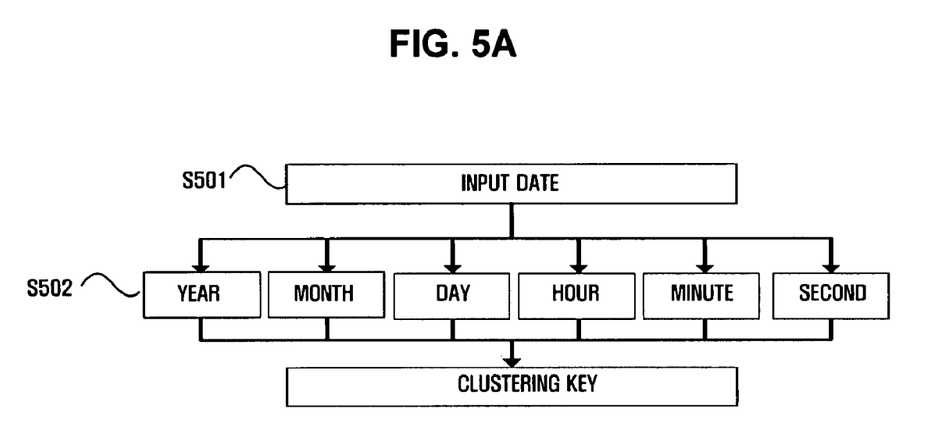
FIGS. 5A-5C illustrates a method of generating a clustering key from metadata according to an example embodiment of the present invention.
Figure 5B:
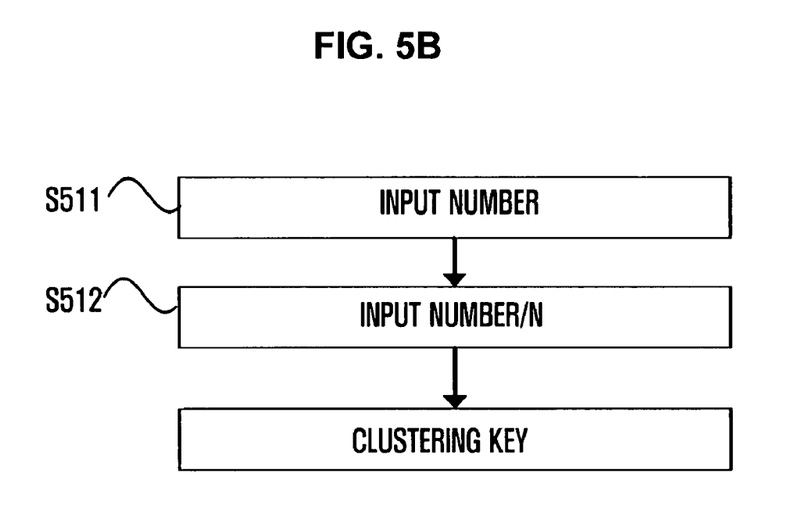
Figure 5C:
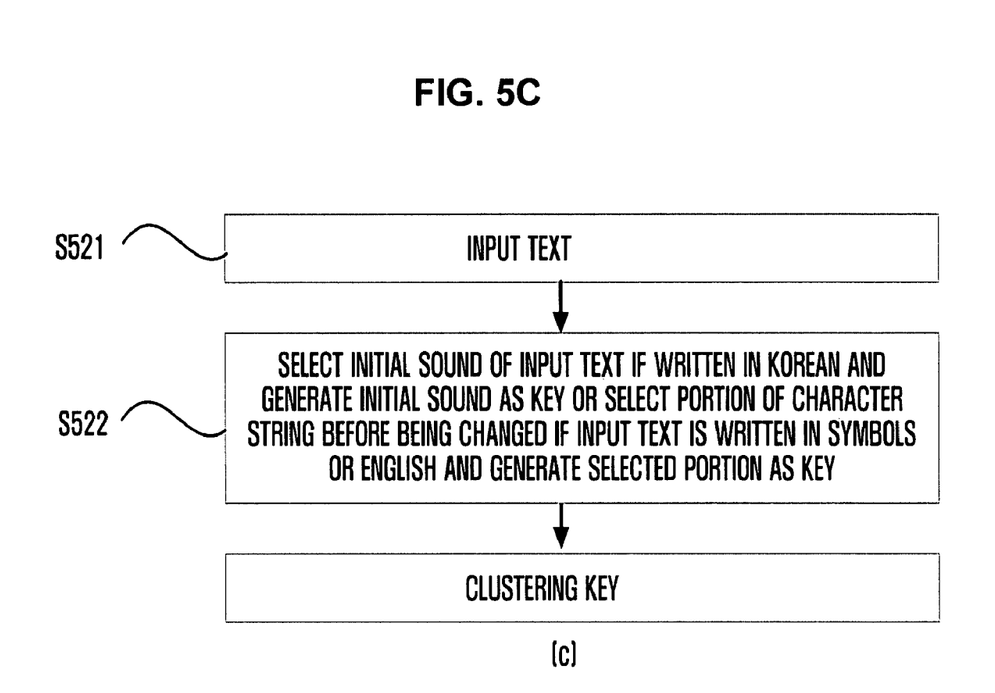

FIGS. 5A-5C illustrate a method of generating a clustering key from metadata according to an example embodiment of the present invention. Specifically, FIG. 5A illustrates an example of generating a clustering key from date-related metadata. If a date is input, the date may be divided into years, months, days, hours, minutes, and/or seconds. In addition, a threshold time unit may be determined according to the amount of shortcuts that are to be provided. Then, portions of the date exceeding the threshold time unit may be abandoned, thereby generating a clustering key of the input date (operations S501 and S502). That is, if shortcuts are to be generated in units of months, then the month may be determined to be a threshold time unit. Then, portions of the input date that are smaller than the month are abandoned, thereby generating a clustering key (e.g., "200601").

FIG. 5B illustrates an example of generating a clustering key from number-related metadata. A number may be divided in units of decimal digits, and a threshold digit may be determined according to the amount of shortcuts that are to be provided. Then, a quotient may be obtained by dividing the number by the threshold digit, thereby generating a clustering key of the number. For example, if shortcuts are to be generated in units of N, a quotient is obtained by dividing an input number by N (threshold digit), thereby generating a clustering key of the input number (operations S511 and S512).

FIG. 5C illustrates an example of generating a clustering key from text-related metadata. Texts may be classified in English or Korean alphabetical order. For example, if a text is input, the generation module 220 determines whether the input text is written in English or Korean. If the input text is written in Korean, an initial sound of the Korean text is selected and used as a clustering key of the input text. If the input text is written in symbols or English, a first letter of the text is selected and used as a key value (operations S521 and S522). Therefore, the generation module 220 may generate a key "A" for all texts in which a first letter is "A" and a key "B" for all texts in which a first letter is "B." In addition, since the input text may be represented by code values, such as Unicode or ASCII code values, the code values may be divided based on a threshold code value selected from the code values, and the threshold code value may be used as a clustering key. That is, since an ASCII code value of the letter "A" is 065, the code values are divided based on 065. Then, the ASCII code value "065" for the letter "A" is selected, and the remaining code values are abandoned, thereby generating 065 as a key value for "A."

Figure 6:
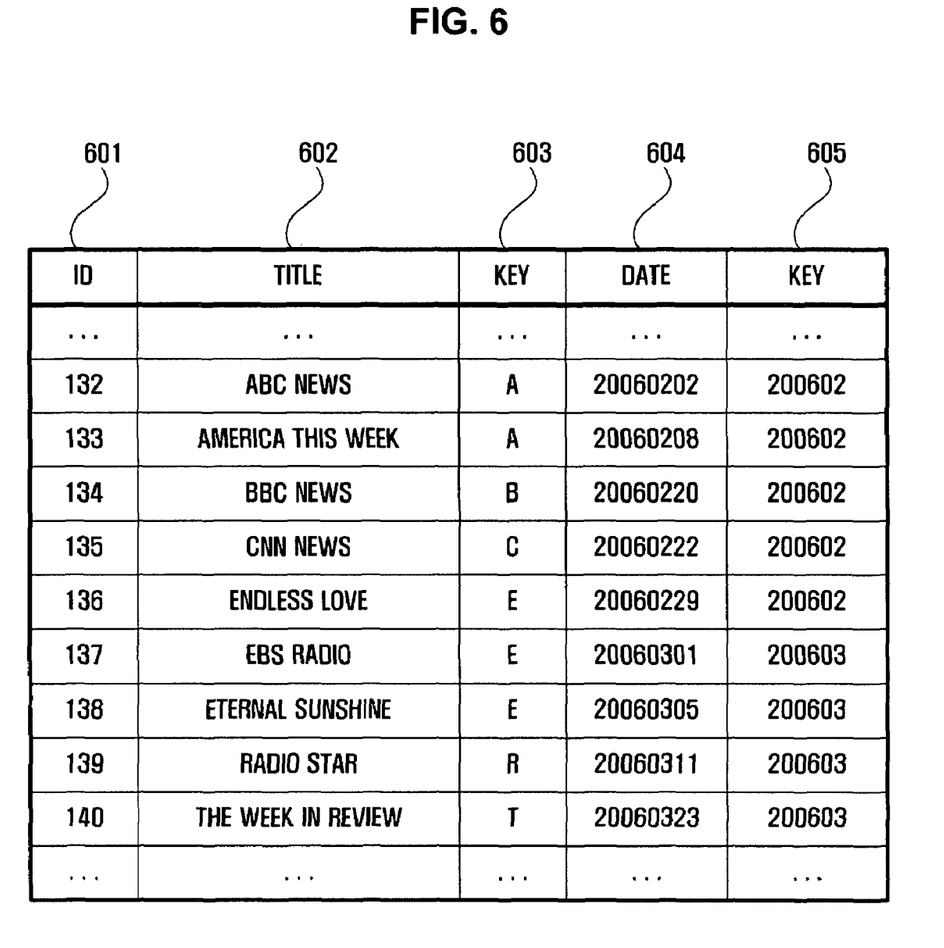
FIG. 6 illustrates clustering key values stored together with metadata according to an example embodiment of the present invention.

FIG. 6 illustrates clustering key values stored together with metadata according to an example embodiment of the present invention. The storage module 230 may store metadata 602 and 604 and clustering keys 603 and 605, generated by the generation module 220, using the relational database technology. In addition, the storage module 230 may store IDs 601 indicating physical locations of contents.

Figure 7A:
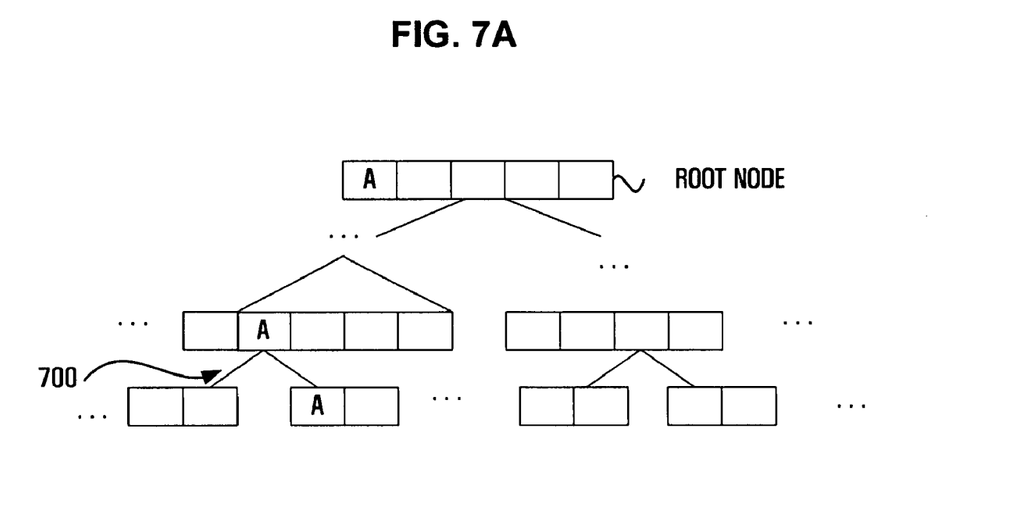
FIGS. 7A-7B are conceptual diagrams illustrating an index for managing metadata using a B tree according to an example embodiment of the present invention.
Figure 7B:
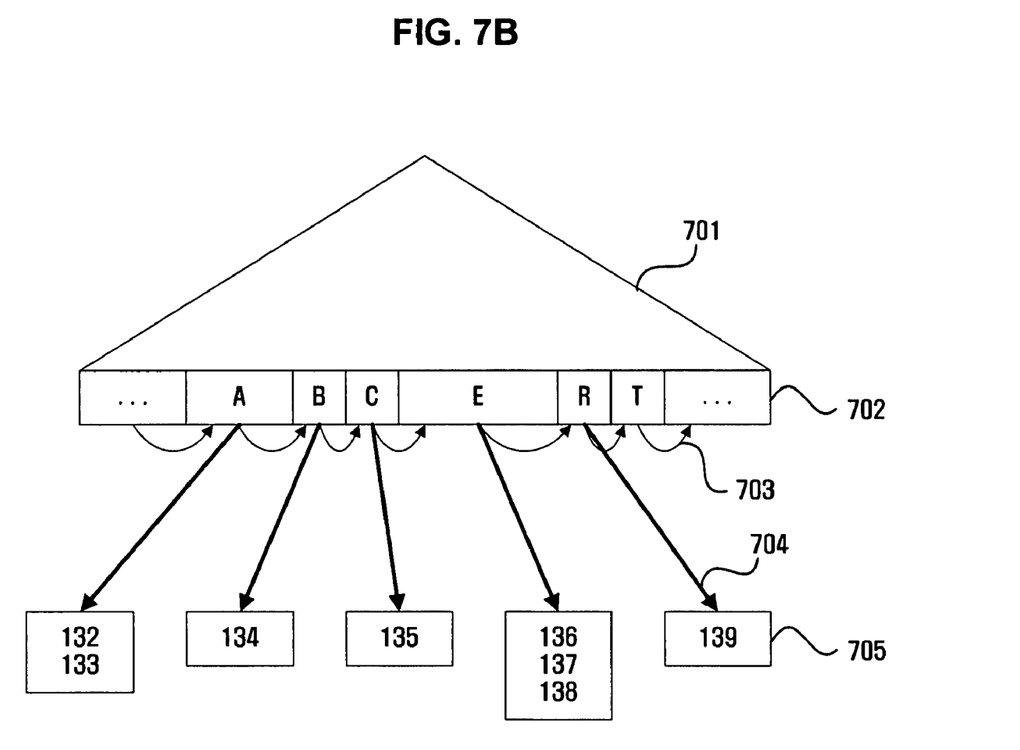

FIGS. 7A and 7B are conceptual diagrams illustrating an index 701 for managing metadata using a B tree according to an example embodiment of the present invention. Referring to FIG. 7A, the index 701 is managed from the root node using the B tree in order to quickly find a predetermined key value (for example, "A") of a leaf node. That is, nodes pointing at a key value "A" in the index 701 are browsed from the root node to the key value "A" stored in a final leaf node. In addition, if metadata having a predetermined key is added to the index 701 causing the number of nodes to exceed a threshold number, the nodes are divided again as indicated by reference numeral 700, and the index 701 is rearranged using the B tree.

Referring to FIG. 7B, key values may be stored in leaf nodes 702 of the index 701, and IDs having the same key value may be stored in separate extension nodes 705. Each of the leaf nodes 702 may include a pointer 703 pointing to a neighboring node, a pointer 704 pointing to a corresponding one of the extension nodes 705, and the number of IDs having the same key value corresponding to the respective key node. Each of the extension nodes 705 may include a pointer pointing to a neighboring node.

Figure 8:
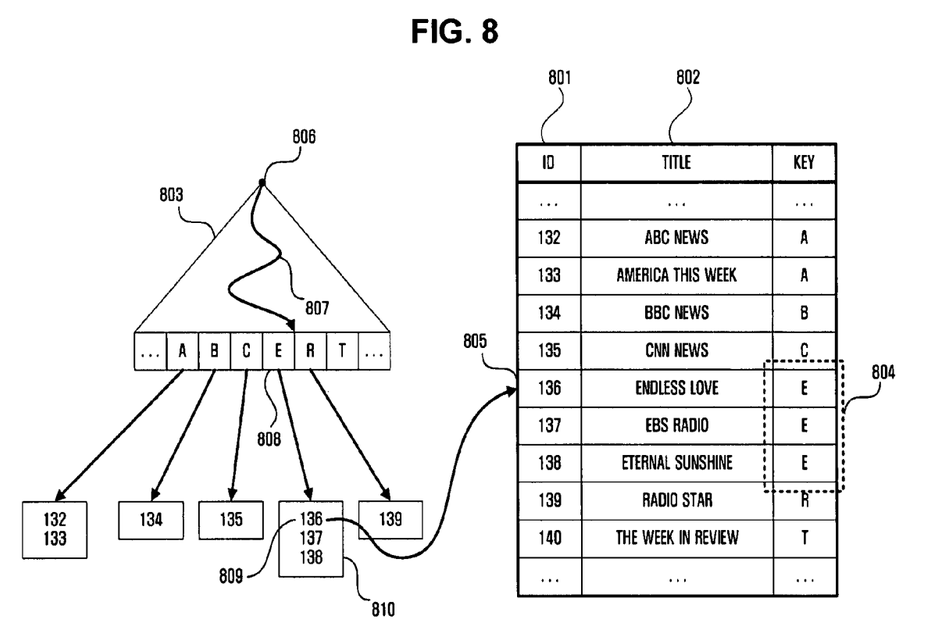
FIG. 8 is a conceptual diagram illustrating a process of browsing contents included in a shortcut using a B tree according to an example embodiment of the present invention.

FIG. 8 is a conceptual diagram illustrating a process of browsing contents included in a shortcut using a B tree according to an embodiment of the present invention. If a user selects a shortcut (UI) on the output module 260, a list of corresponding contents may be displayed on the screen of the output module 260. To this end, the processing module 250 generates a query using a key value of the selected shortcut and searches a B-tree index from a root node for a leaf node corresponding to a condition or the key value.

Referring to FIG. 8, a user browses contents using metadata of the contents, e.g., title 802, and shortcuts are provided in Korean alphabetical order. In addition, IDs 801 of contents stored in the storage module 230 and a B-tree index 803 managed by the management module 240 are illustrated.

If the user selects a shortcut "E" 804 on the screen, contents included in the shortcut "E" 804, such as "Eternal Love," may be output on the screen. To this end, the processing module 250 generates a query using the key value "E" and searches the B-tree index 803 from a root node 806 for a leaf node 808 corresponding to the key value "E." As a result, the user can identify that a record 805 corresponding to ID 136 (809) is the first content included in the shortcut "E" 804. By accessing the record 805 corresponding to the ID 136 (809), the processing module 250 can output information (e.g., the title 802) regarding the content that corresponds to the ID 136 (809) on the screen. Therefore, the processing module 250 may sequentially explore a required number of extension nodes 810 and browse IDs (information). Then, the processing module 250 may access contents corresponding to the IDs and display a desired number of lists of contents on the screen.

Figure 9:
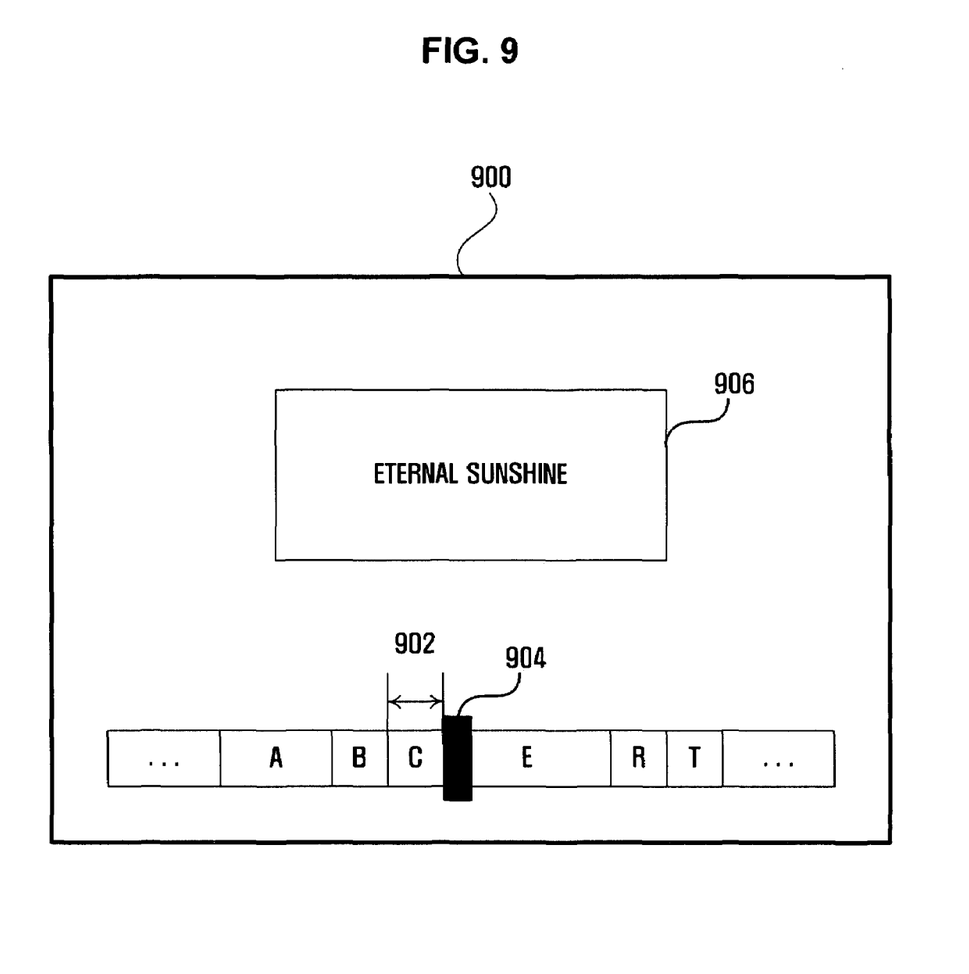
FIG. 9 illustrates shortcuts output on a screen according to an example embodiment of the present invention.

FIG. 9 illustrates shortcuts output on the screen 900 according to an embodiment of the present invention. Referring to FIGS. 7 and 9, the output module 260 may sequentially explore the leaf nodes 702 along the pointers 703 of the leaf nodes 702 of the index 701 and display shortcuts using key values stored in the leaf nodes 702. That is, the leaf nodes 702 of the B-tree index 701 are sequentially explored, and the key values of the index 701 are appropriately formatted and represented by names of the shortcuts. In addition, the number of IDs stored in each of the extension nodes 705 may be represented by the number of pieces of contents allocated to each shortcut. Alternatively, a length 902 of a section for a shortcut may be determined by the number of IDs and presented accordingly on the screen 900.

After searching the B tree illustrated in FIG. 8, a user may select an ID while moving between IDs included in a shortcut output on the screen 900 using an input device (such as a remote control or a control key in a keyboard). Then, contents of the selected ID may be displayed on an upper part of the screen 900. For example, a shortcut "E" may include IDs 136 through 138 that indicate physical locations of contents. If the user moves to ID 138 using, for example, a control key, contents 906 corresponding to the ID 138 may be output on the screen 900. In addition, if the user clicks, for example, on an up/down key of the input device, the user can move a cursor 904 directly to a first ID of a shortcut. Then, lists of contents corresponding to IDs included in the shortcut may be bundled and displayed together on the screen.

An apparatus and method for browsing contents according to aspects of the present invention can efficiently browse large-volume contents and more quickly access contents desired by a user.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the processing module 250 and the output module 260 can be implemented as a single control module to perform functions as described in addition to controlling operations of the apparatus 200, as shown in FIG. 2. Furthermore, the apparatus 200 may be externally connected through a wired or wireless connection to a multimedia content device that receives and stores the content. Accordingly, the apparatus 200 may externally manage the content by receiving then indexing the metadata. Alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Furthermore, the software modules as described can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Accordingly, it is intended, therefore, that the present invention not be limited to the various example embodiments disclosed, but that the present invention includes all embodiments falling within the scope of the appended claims.

What is claimed is:

1. An apparatus for browsing contents, the apparatus comprising:

a generation module to generate a plurality of key values using metadata of the contents, wherein each piece of content is assigned a key value from the plurality of key values;

a management module to manage an index, the index includes a plurality of leaf nodes, each leaf node corresponds to a respective key value, and each leaf node includes one or more pointers that point to a physical location of the contents assigned to the key value that corresponds to the respective leaf node, wherein the number of pointers included in each leaf node is based on the amount of contents assigned to the key value associated with the respective leaf node;

an output module to provide a user interface (UI) to enable a user to browse the contents to display the index including a plurality of shortcuts that correspond to the plurality of leaf nodes, wherein the displayed size of each shortcut is adjusted based on the number of pointers included in the corresponding leaf node of each shortcut;

a processing module to search the index from a root node for the leaf node corresponding to the key value, when a shortcut corresponding to the leaf node and corresponding to the key value is selected by the user on the UI; and one or more processors to control the operation of the generation module, the management module, the output module, and the processing module.

2. The apparatus as claimed in claim 1, wherein each leaf node of the index corresponds to only one key value.

3. The apparatus as claimed in claim 1, wherein the index uses a B tree.

4. The apparatus as claimed in claim 1, wherein the generation module assigns each key value to metadata of a same category.

5. The apparatus as claimed in claim 1, wherein metadata having a same key value is included in a same shortcut corresponding to the same key value and displayed on the UI.

6. The apparatus as claimed in claim 1, wherein each leaf node comprises at least one of a pointer to point to a neighboring leaf node and a pointer to point to an extension node of the leaf node.

7. The apparatus as claimed in claim 1, wherein, if the metadata is a date, the generation module divides the date in time units of years, months, days, hours, minutes or seconds, selects one of the time units, and generates the key value including the selected time unit.

8. The apparatus as claimed in claim 1, wherein, if the metadata is a number, the generation module determines a threshold digit, and generates the key value that includes a quotient obtained by dividing the number by the threshold digit.

9. The apparatus as claimed in claim 1, wherein:
if the metadata is a text, the generation module divides code values of the text based on a threshold code value selected from the code values, and generates the key value from the threshold code value; and
the code values are Unicode or ASCII code values.

10. The apparatus as claimed in claim 1, wherein the contents are at least one of audio files, video files, and image files.

11. A method of browsing contents using a device having a user interface, the method comprising:
generating a plurality of key values using metadata of the contents, wherein each piece of content is assigned a key value from the plurality of key values;
managing an index for accessing the contents, the index includes a plurality of leaf nodes, each leaf node corresponds to a respective key value, and each leaf node includes one or more pointers that point to a physical location of contents assigned to the key value that corresponds to the respective leaf node, wherein the number of pointers included in each leaf node is based on the amount of contents assigned to the key value associated with the respective leaf node;
outputting on the UI the index including a plurality of shortcuts that correspond to the plurality of leaf nodes, wherein the displayed size of each shortcut is adjusted based on the number of pointers included in the corresponding leaf node of each shortcut; and
searching the index from a root node for the leaf node corresponding to the key value, when a shortcut corresponding to the leaf node and corresponding to the key value is selected by a user.

12. The method as claimed in claim 11, wherein the index uses a B tree.

13. The method as claimed in claim 11, wherein the generating of the key value comprises:
assigning each key value to metadata of a same category.

14. The method as claimed in claim 11, wherein metadata having a same key value is included in a same shortcut corresponding to the same key value and displayed on the UI.

15. The method as claimed in claim 11, wherein each leaf node comprises at least one of a pointer to point to a neighboring leaf node and a pointer to point to an extension node of the leaf node.

16. The method as claimed in claim 11, wherein
if the metadata is a date, the generating further comprises dividing the date in time units of years, months, days, hours, minutes or seconds, selecting one of the time units, and generating the key value including the selected time unit.

17. The method as claimed in claim 11, wherein
if the metadata is a number, the generating further comprises determining a threshold digit, and generating the key value including a quotient obtained after by dividing the number by the threshold digit.

18. The method as claimed in claim 11, wherein
if the metadata is text, the generating further comprises dividing code values of the text based on a threshold code value, which is selected from the code values, and generating the key value from the threshold code value, wherein the code values are Unicode or ASCII code values.

19. An apparatus for indexing contents in a device, the apparatus comprising:
a generation module to generate a plurality of key values using metadata of the contents, wherein each piece of content is assigned a key value from the plurality of key values;
a management module to create and to manage an index for accessing the contents, the index includes a plurality of leaf nodes, each leaf node corresponds to a respective key value, and each leaf node includes one or more pointers that point to a physical location of contents assigned to the key value that corresponds to the respective leaf node, wherein the number of pointers included in each leaf node is based on the amount of contents assigned to the key value associated with the respective leaf node;
an output module to provide a user interface (UI) to enable a user to browse the contents, to display the index including a plurality of shortcuts that correspond to the plurality of leaf nodes, wherein the displayed size of each shortcut is adjusted based on the number of pointers included in the corresponding leaf node of each shortcut; and
one or more processors to control the execution of the generation module, the management module, and the output module.

20. The apparatus as claimed in claim 19, wherein the generation module generates each key value to correspond to metadata of a same category.

21. A method of indexing contents in a device, the method comprising:
generating a plurality of key values using metadata of the contents, wherein each piece of content is assigned a key value from the plurality of key values;
storing the plurality of key values in an index used for accessing the contents, the index includes a plurality of leaf nodes, each leaf node corresponds to a respective key value, and each leaf node includes one or more pointers that point to a physical location of contents assigned to the key value that corresponds to the respective leaf node, wherein the number of pointers included in each leaf node is based on the amount of contents assigned to the key value associated with the respective leaf node;and outputting the contents to enable a user to browse the contents, via a user interface on a screen of the device, the outputting includes displaying the index including a plurality of shortcuts that correspond to the plurality of leaf nodes, wherein the displayed size of each shortcut is adjusted based on the number of pointers included in the corresponding leaf node of each shortcut.

22. The method as claimed in claim 21, wherein the generating of the key value comprises:
generating each key value to correspond to metadata of a same category.

* * * * *